(12) United States Patent
Schulte

(10) Patent No.: US 7,374,707 B2
(45) Date of Patent: *May 20, 2008

(54) METHOD FOR PRODUCING ADHESIVE CLOSING PARTS

(75) Inventor: Axel Schulte, Holzgerlingen (DE)

(73) Assignee: Gottlieb Binder GmbH & Co., Holzgerlingen (DE)

( * ) Notice: Subject to any disclaimer, the term of this patent is extended or adjusted under 35 U.S.C. 154(b) by 381 days.

This patent is subject to a terminal disclaimer.

(21) Appl. No.: 10/312,782

(22) PCT Filed: Nov. 20, 2001

(86) PCT No.: PCT/EP01/13385

§ 371 (c)(1),
(2), (4) Date: Dec. 30, 2002

(87) PCT Pub. No.: WO02/051277

PCT Pub. Date: Jul. 4, 2002

(65) Prior Publication Data

US 2003/0104137 A1 Jun. 5, 2003

(30) Foreign Application Priority Data

Dec. 22, 2000 (DE) .............................. 100 65 819
Feb. 14, 2001 (DE) .............................. 101 06 705

(51) Int. Cl.
*A44B 18/00* (2006.01)
*B05D 1/02* (2006.01)
*B05D 3/06* (2006.01)
*B29C 35/08* (2006.01)

(52) U.S. Cl. ...................... 264/129; 264/349; 264/447; 264/492; 264/494; 427/424; 427/427.3; 427/427.4; 427/557; 427/558

(58) Field of Classification Search ........... 264/171.13, 264/405, 447, 493, 494, 401, 497, 129; 156/242, 156/291; 427/421, 557, 558, 424, 427.3, 427/427.4; 700/118, 119

See application file for complete search history.

(56) References Cited

U.S. PATENT DOCUMENTS

| 3,408,705 | A | * | 11/1968 | Kayser et al. ................. 24/452 |
| 3,550,837 | A |   | 12/1970 | Erb |
| 4,111,634 | A |   | 9/1978  | Limbach et al. |
| 4,875,259 | A | * | 10/1989 | Appeldorn ................. 24/584.1 |
| 4,897,026 | A |   | 1/1990  | Yokoya |
| 5,059,266 | A | * | 10/1991 | Yamane et al. ................ 156/64 |
| 5,136,515 | A | * | 8/1992  | Helinski ..................... 700/119 |

(Continued)

FOREIGN PATENT DOCUMENTS

DE 19906008 8/2000

(Continued)

*Primary Examiner*—Melvin Mayes
(74) *Attorney, Agent, or Firm*—Roylance, Abrams, Berdo & Goodman, L.L.P.

(57) ABSTRACT

A method forms adhesive closing parts from a plastic material. To produce at least one adhesive closing element (3) without a form tool in at least one partial area, the plastic material is deposited in the form of drops. The drops are successively delivered by at least one application device (9). The locations of the deposition of the drops are selected in a three-dimensional manner in view of the form of the adhesive closing elements (3) to be produced.

52 Claims, 4 Drawing Sheets

U.S. PATENT DOCUMENTS

| | | | |
|---|---|---|---|
| 5,231,738 A * | 8/1993 | Higashinaka | 24/446 |
| 5,369,853 A * | 12/1994 | Okawa et al. | 24/446 |
| 5,536,759 A * | 7/1996 | Ramharack et al. | 522/35 |
| 5,625,929 A * | 5/1997 | Hattori et al. | 24/452 |
| 5,694,324 A * | 12/1997 | Masters et al. | 700/118 |
| 5,725,704 A * | 3/1998 | Gallagher et al. | 156/66 |
| 5,792,411 A | 8/1998 | Morris et al. | |
| 5,868,987 A * | 2/1999 | Kampfer et al. | 264/280 |
| 5,951,931 A * | 9/1999 | Murasaki et al. | 264/167 |
| 6,276,032 B1 * | 8/2001 | Nortman et al. | 24/572.1 |
| 6,287,665 B1 * | 9/2001 | Hammer | 428/100 |
| 6,393,673 B1 * | 5/2002 | Kourtidis et al. | 24/304 |
| 6,460,229 B1 * | 10/2002 | Schulte | 24/448 |
| 6,509,084 B2 * | 1/2003 | Sturtevant et al. | 428/141 |
| 6,572,727 B1 * | 6/2003 | Schulte | 156/278 |
| 6,627,133 B1 * | 9/2003 | Tuma | 264/167 |
| 6,730,069 B2 * | 5/2004 | Tanzer et al. | 604/391 |
| 2001/0018110 A1 * | 8/2001 | Tuman et al. | 428/99 |
| 2002/0111707 A1 * | 8/2002 | Li et al. | 700/118 |
| 2003/0038408 A1 * | 2/2003 | Schulte | 264/493 |
| 2005/0153096 A1 * | 7/2005 | Gerber et al. | 428/85 |

FOREIGN PATENT DOCUMENTS

| | | | |
|---|---|---|---|
| FR | 2166427 | * | 8/1973 |
| WO | 9703630 | | 2/1997 |

* cited by examiner

METHOD FOR PRODUCING ADHESIVE CLOSING PARTS

REFERENCE TO RELATED APPLICATION

This application is related to U.S. patent application Ser. No. 10/239,309 filed on Sep. 20, 2002 in the name of Axel Schulte and entitled "Method of Producing Adhesive Closure Parts."

FIELD OF THE INVENTION

The present invention relates to a process for producing adhesive closing parts in which individual adhesive fastener elements are made from a plastic material.

BACKGROUND OF THE INVENTION

A process for producing adhesive closing parts is disclosed in DE 198 28 856 C1. Application of this process is relatively costly when the adhesive fastening parts to be manufactured in which the adhesive fastener elements are very tightly packed and small. For example, in manufacture of so-called microfasteners, the adhesive fastener elements are provided in the form of stems thickened at their ends or provided with side projections in very high packing densities of 200 or more adhesive fastener elements per square centimeter. Shaping tools, such as dandy rollers, are required to shape the stems at the end. High production costs are incurred because of the very large number of openings in the roller, which may be produced by etching, electrodeposition, or laser machining.

SUMMARY OF THE INVENTION

Objects of the present invention are to provide a process permitting very cost-effective production of adhesive fastener elements in the widest possibly variety of desired shapes.

According to the present invention, these objects are attained by at least one adhesive fastener element in at least one partial area being formed without use of a shaping tool. Instead, the plastic material is deposited in consecutive drops by at least one application device. The locations of deposits of the drops are selected in three-dimensions relative to the respective adhesive fastener element to be formed.

The buildup of the adhesive fastener elements according the present invention is by the smallest possible individual drops being deposited in succession at selected locations. This formation permits making the adhesive fastener elements, in any configuration, in drops virtually as small as desired and in the greatest packing density desired, without necessitating development of correspondingly costly shaping tools. The control of the locations of deposit of the drops is accomplished by corresponding relative movements between application device and a substrate carrying the deposit, preferably under computer control. This control permits production without great difficulty, not only of the shapes of adhesive fastener elements disclosed in DE 198 28 856 C1, such as stems with mushroom heads, but also of shapes which can be produced only with great difficulty or not at all by use of conventional shaping tools, such as loops, hooks, or anchors. Such shapes could be produced only poorly, or not at all, with a shaping tool because of the undercuts present.

The process of the present invention may be employed for production of adhesive fastener elements on which various types of materials as a backing element from the surface of which the adhesive fastener elements project. In other words, a plastic material, especially one in sheet form, may be used as the substrate on which the drops forming the adhesive fastener elements provided for the respective application purposes are deposited.

When a plastic material is used as backing element, the drops forming the adhesive fastener elements can be deposited on the finished backing element. However, it is also possible to form both the adhesive fastener elements and the backing element from drops deposited. For example, a sheet of plastic making up the backing element and the adhesive fastener elements present on the sheet may be built up in a single production pass from droplets sprayed on by means of application devices.

Textile materials, such as ones in knitted or woven form, may be used as the material of the backing element in place of plastic. The backing element need not be a flat body. Shaped bodies on whose surface the projecting adhesive fastener elements are formed by the pertinent application device may be provided for special applications.

Use is made preferably of an application device having at least one nozzle from which the plastic material is sprayed in droplets of a size of a few picoliters. Such nozzle devices may be actuated by piezoelectric or electrothermal means to centrifuge the liquid plastic material. The plastic material preferably comprises acrylate which sets after deposit of each drop or group of drops, for example, after the location of deposit has been subjected to ultraviolet radiation. The plastic material may, however, also be a thermoplastic which is caused to set by chemical means or in another manner.

Construction of the adhesive fastener elements may be carried out at high operating speed, since the droplets may be sprayed in succession at a high rate. Rates of several kilohertz may be reached immediately in computer-controlled operation. An application device may also be provided with a plurality of nozzles operated simultaneously in order to construct a plurality of rows of adhesive fastener elements simultaneously.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
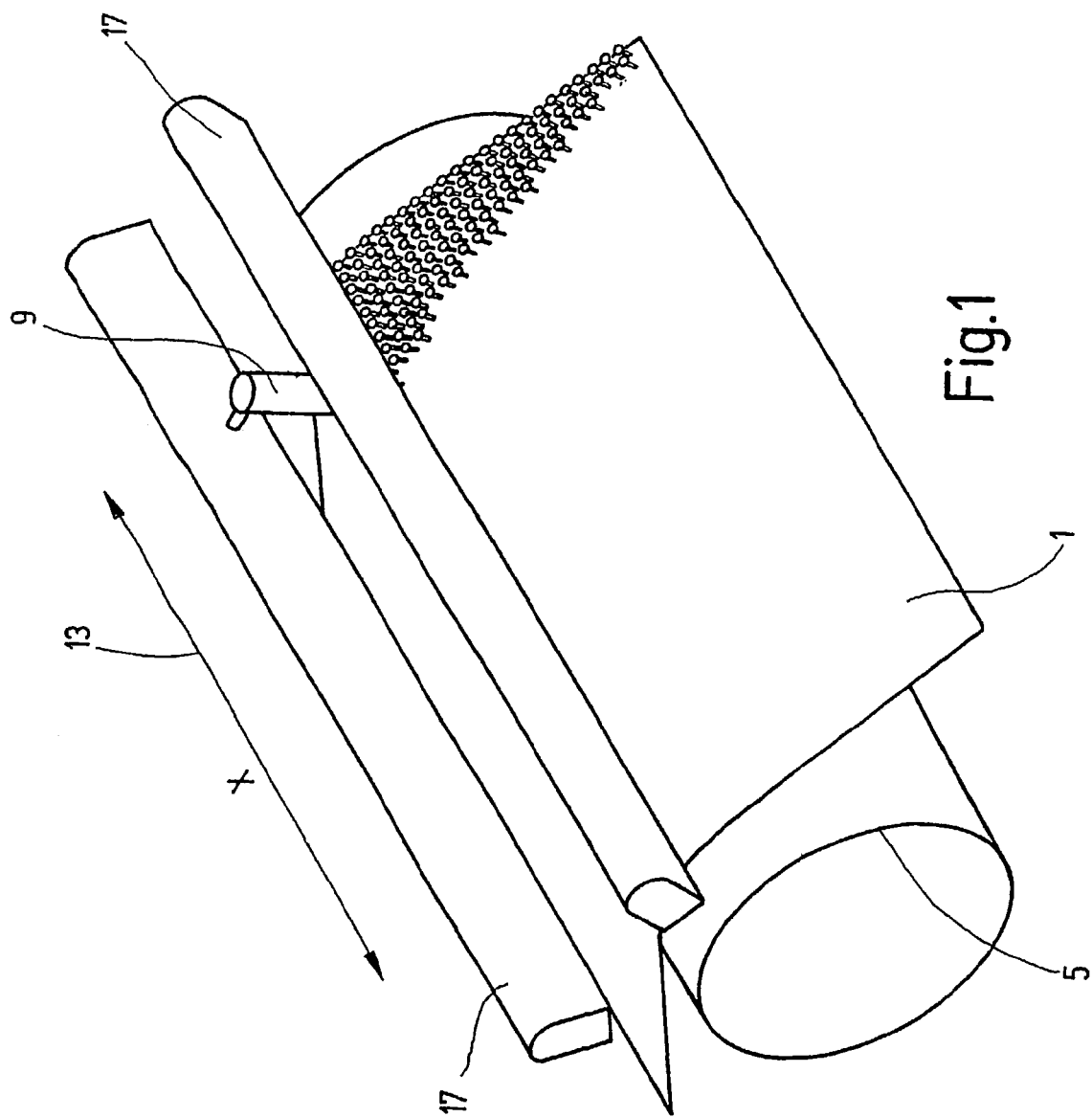
FIG. 1 is a highly simplified, diagrammatic perspective view of a device for application of a process according to first embodiment of the present invention.
Figure 2:
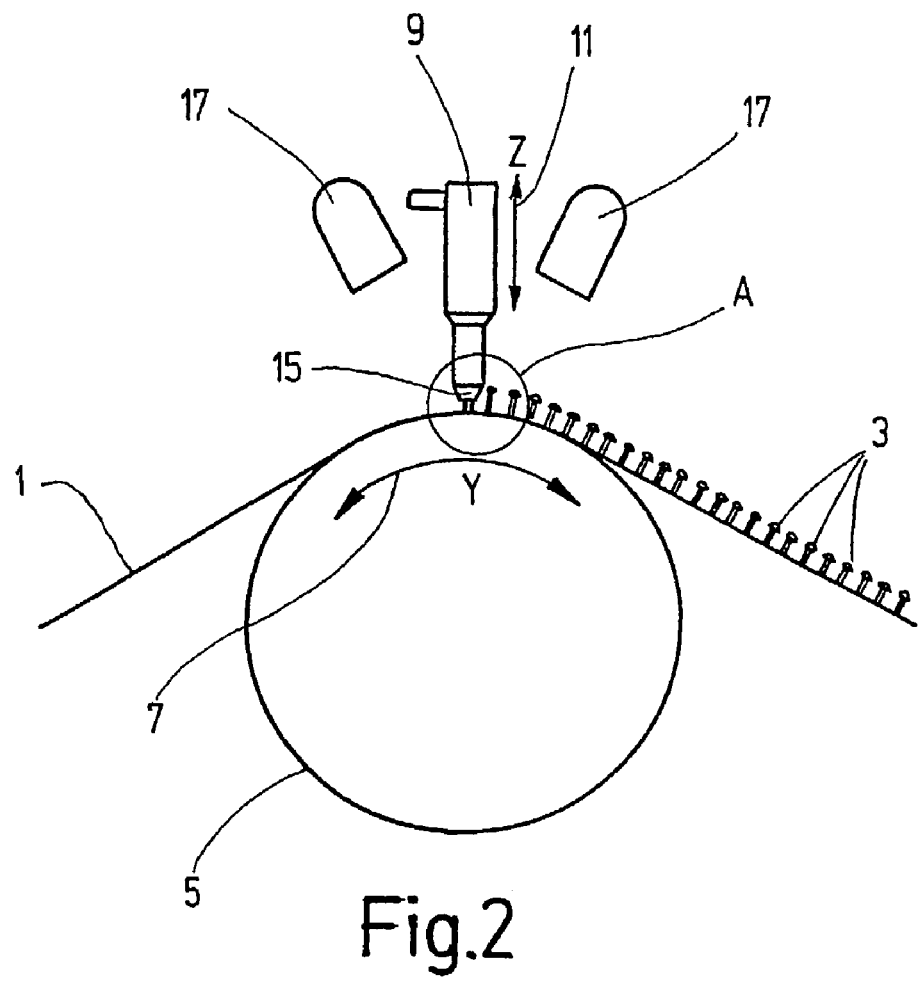
FIG. 2 is a diagrammatic side elevational view of the device shown in FIG. 1.
Figure 3:
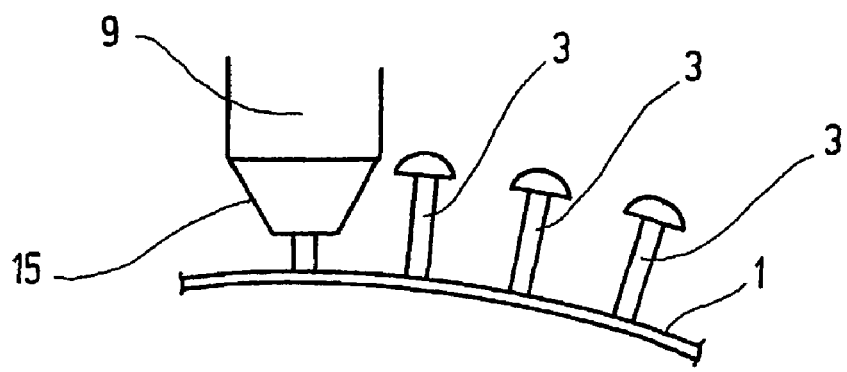
FIG. 3 is an enlarged, partial side elevational view of the area of the device designated as A in FIG. 2.

FIGS. 1 to 3 illustrate the process of the present invention on the basis of an example in which the adhesive fastener elements with a backing element 1 in the form of sheet polyethylene. One surface of backing element 1 has adhesive fastener elements 3 formed as stems thickened on the ends. In the example shown in FIGS. 1 to 3, the thickened ends are in the form of mushrooms, as is to be seen in FIG. 3 in particular. For the sake of clarity, the adhesive fastener elements in all the figures are shown in greatly exaggerated size and spaced at greatly exaggerated distances from each other.

The backing element 1 is mounted on a guide roller 5, which may be driven in both directions of rotation for execution of controlled rotational steps. In this manner, the backing element 1 may be moved back and forth in the direction of a Y axis (see curved arrow 7 in FIG. 2) relative to the location of deposit of drops situated within an area of application A. Droplets of liquefied plastic are deposited by an application device 9. Application device 9 is movable in the direction of the Z axis (see double arrow 11 in FIG. 2) and in the direction of the X axis perpendicular thereto (see double arrow 13 in FIG. 1). Consequently, the location selected for droplet deposit relative to the backing element 1 may be three-dimensional, as a result of corresponding movement of the guide roller 5, and accordingly of the backing element 1, and the application device 9. As an alternative, the application device 9 could be movable along all three axes (X, Y and Z) relative to the backing element 1.

In the example illustrated in FIGS. 1 to 3, the application device 9 has a nozzle spraying the liquefied plastic. In the operating state shown in FIG. 3, the nozzle 15 assumes a position relative to the backing element 1 such that the stem of an adhesive fastener element 3 is built up by sequential spray applications of droplets. Each droplet has a volume of a few picoliters. In the state illustrated in FIG. 3, the stem sprayed on through the nozzle 15 is built up to approximately one-third its height. The droplets are sprayed, preferably under computer control, at a high frequency of 2 kilohertz, for example. The droplets deposited in each operation are hardened during the intervals between the spraying processes. This hardening can be accomplished in different ways, for example, by spray application of a setting agent or by supply of energy, especially by ultraviolet radiation. In the present example, nine ultraviolet lamps 17 for irradiation of the application area A with ultraviolet radiation are mounted beside the application device 9. For the setting processes, the application device 9 is returned, preferably in the direction of the Z axis, and/or the backing element 1 is displaced in the direction of the Y axis by movement of the guide roller 5, before the corresponding elements are brought back to the position corresponding to the location selected for droplet application.

Figure 4:
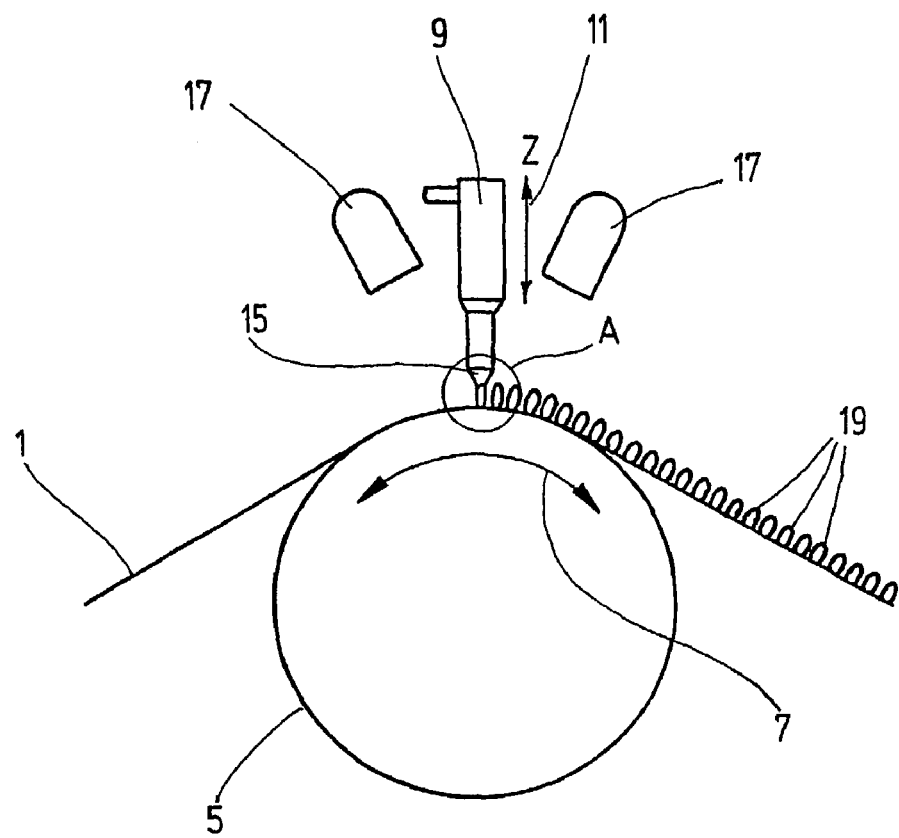
FIG. 4 is a side elevational view of a device, similar to that in FIG. 2, for the production of adhesive fastener elements in the form of loops according to a second embodiment of the present invention.
Figure 5:
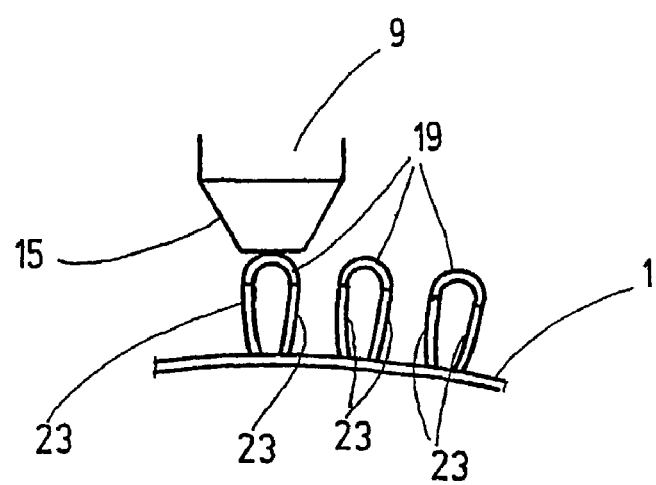
FIG. 5 is an enlarged, partial side elevational view of the area of the device designated as A in FIG. 4.

FIGS. 4 and 5 serve to illustrate the execution of this process for adhesive fastener elements 19 in the form of loops formed on the backing element 1. The process applied is such that initially two stems 23 are built up for each loop and are then bent over in arcs as illustrated in FIG. 5.

Figure 6:
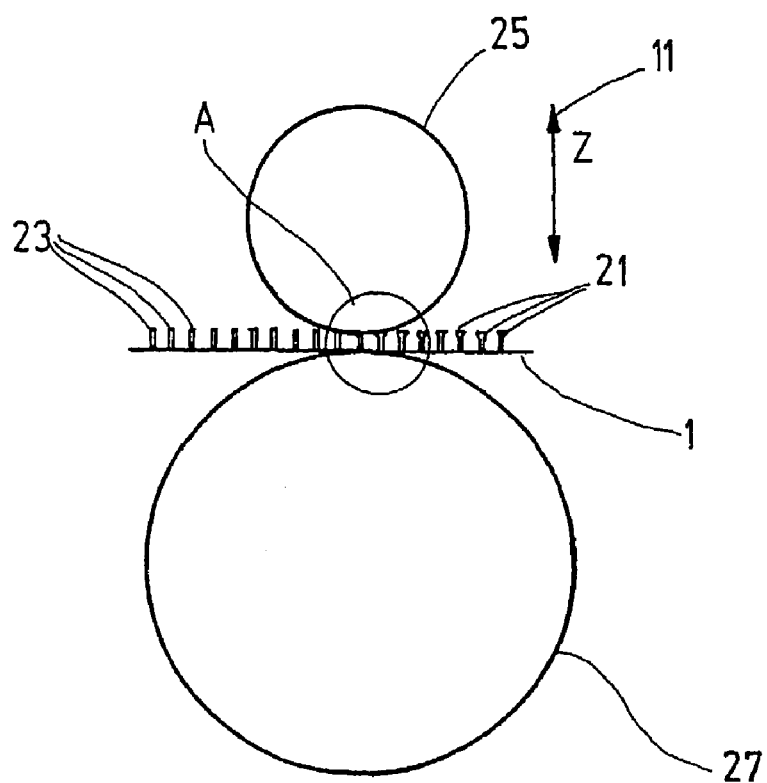
FIG. 6 is a highly simplified, diagrammatic side elevational view of a device for production of adhesive fastener elements with trough-shaped heads by calendering according to a third embodiment of the present invention.
Figure 7:
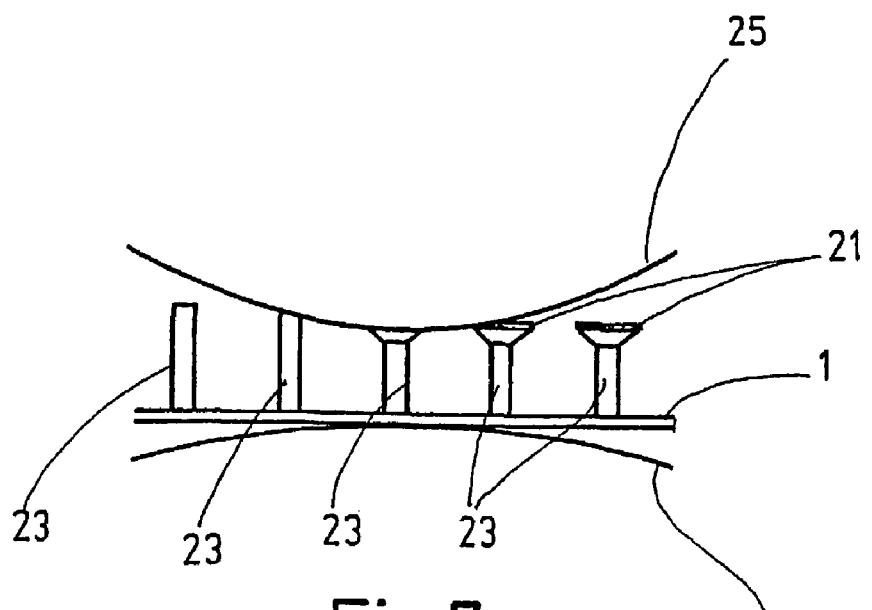
FIG. 7 is an enlarged, partial side elevational view of the area of the device designated as A in FIG. 6.

FIGS. 6 and 7 illustrate the production of flattened adhesive fastener component parts. Adhesive fastener elements 21 are formed by first building up stems 23 without thickened areas on the ends. A compression gap is formed by a calender roller 25 operating in conjunction with a mating roll 27. Thickened end areas of the adhesive fastener elements 21 are formed which are trough-shaped (see FIG. 7) by calendering on the ends of the stems 23.

Liquefied acrylates, the viscosity of which may be adjusted by addition as desired of a reactive thinner, for example, are suitable as plastic material to be applied in droplet form. The hardenability by ultraviolet radiation can be enhanced, preferably by addition of a photoinitiator.

In one example the plastic material contains as acrylic material 90 percent Ebecryl 4835, a prepolymer made by UCB company, 8 percent HDDA (UCB company) as reactive thinner for viscosity adjustment, and 2 percent Darocur 1173, made by the Ciba-Geigy company, as photoinitiator.

In another example, 90-percent Ebecryl 4835 and 4-percent Ebecryl 230 from the UCB company are provided as acrylate materials. 4-percent HDDA from the UCB company is employed as reactive thinner and 2-percent Darocur from the Ciba-Geigy company as photoinitiator.

Plastic materials of a different composition may, of course, also be employed for application of the process of the present invention. Backing elements of a different nature, such as textile materials, or molded elements provided for special applications may be used in place of a sheet of polyethylene.

The present invention has been described in the foregoing on the basis of examples in which the adhesive fastener elements, as a whole, are in the form of droplets spray-applied in succession. The process may, of course, also be applied to advantage in such a way that simply formed stems of adhesive fastener elements may, when straight stems, for example, are involved, be produced conventionally with shaping tools, with no additional expense, as initial material. Droplets of the geometric configurations desired are then sprayed onto the initial material to produce finished adhesive fastener elements.

While various embodiments have been chosen to illustrate the invention, it will be understood by those skilled in the art that various changes and modifications can be made therein without departing from the scope of the invention as defined in the appended claims.

What is claimed is:

1. A method of producing adhesive closing parts having individual adhesive fastener elements formed of plastic material, comprising the steps of:
   forming essentially all of the adhesive fastener elements on a plastic backing element by depositing plastic material from at least one application device in consecutively released droplets on the plastic backing element building up the backing element and the adhesive fastener elements without using a shaping tool; and
   varying locations of the droplets in three dimensions for a desired shape of the adhesive fastener elements.

2. A method according to claim 1 wherein the backing element is a preformed sheet.

3. A method according to claim 1 wherein the backing element is a textile material.

4. A method according to claim 3 wherein the textile material is knitted or woven.

5. A method according to claim 1 wherein the backing element is a molded element.

6. A method according to claim 5 wherein the molded element is a profile element.

7. A method according to claim 1 wherein
the application device has at least one nozzle; and
plastic material is sprayed from the nozzle with each droplet having a volume measured in picoliters.

8. A process according to claim 7 wherein
liquid plastic is sprayed from the nozzle.

9. A process according to claim 7 wherein
the backing element and the nozzle are moved to vary the locations of the droplets in the three dimensions.

10. A process according to claim 1 wherein
the plastic material is solidified after deposit of each droplet.

11. A process according to claim 10 wherein
after solidification, the plastic material has flexibility suitable for hooking and releasing of adhesive fastener elements.

12. A process according to claim 1 wherein
the plastic material is solidified after deposit of a group of droplets.

13. A process according to claim 1 wherein
the plastic material is solidified after being deposited in droplets by delivery of energy.

14. A process according to claim 13 wherein
the energy is electromagnetic radiation.

15. A process according to claim 14 wherein
the energy is ultraviolet radiation or infrared radiation.

16. A process according to claim 13 wherein
the energy results from a chemical reaction.

17. A process according to claim 13 wherein
at least one of the backing element and the application device is moved for solidification to a location different from a position for a preceding droplet deposit.

18. A process according to claim 1 wherein
the droplets are deposited at a frequency greater than 50 hertz.

19. A process according to claim 18 wherein
the frequency is in a kilohertz range.

20. A method of producing adhesive closing parts having individual adhesive fastener elements formed of plastic material, comprising the steps of:
forming essentially all of the adhesive fastener elements on a backing element by depositing plastic material from at least one application device in consecutively released droplets on the backing element without using a shaping tool, the application device having at least one nozzle from which the plastic material is sprayed in droplets with each droplet having a volume measured in picoliters; and
varying locations of the droplets in three dimensions for a desired shape of the adhesive fastener elements by moving the backing element and nozzle.

21. A method according to claim 20 wherein
the backing element is a sheet.

22. A method according to claim 20 wherein
the backing element is a textile material.

23. A method according to claim 22 wherein
the textile material is knitted or woven.

24. A method according to claim 20 wherein
the backing element is a molded element.

25. A method according to claim 24 wherein
the molded element is a profile element.

26. A process according to claim 20 wherein
liquid plastic is sprayed from the nozzle.

27. A process according to claim 26 wherein
the plastic material is solidified after deposit of a group of droplets.

28. A process according to claim 20 wherein
the plastic material is solidified after deposited of each droplet.

29. A process according to claim 20 wherein
the plastic material is solidified after being deposited in droplets by delivery of energy.

30. A process according to claim 20 wherein
the energy is electromagnetic radiation.

31. A process according to claim 20 wherein
the energy is ultraviolet radiation or infrared radiation.

32. A process according to claim 29 wherein
the energy results from a chemical reaction.

33. A process according to claim 29 wherein
at least one of the backing element and the application device is moved for solidification to a location different from a position for a preceding droplet deposit.

34. A process according to claim 29 wherein
after solidification, the plastic material has flexibility suitable for hooking and releasing of adhesive fastener elements.

35. A process according to claim 20 wherein
the droplets are deposited at a frequency greater than 50 hertz.

36. A process according to claim 35 wherein
the frequency is in a kilohertz range.

37. A method of producing adhesive closing parts having individual mechanical hook or loop fastener elements formed of plastic material, comprising the steps of:
forming essentially all of the mechanical hook or loop fastener elements on a backing element by depositing plastic material from at least one application device in consecutively released droplets on the backing element without using a shaping tool;
varying locations of the droplets in three dimensions for a desired shape of the mechanical hook or loop fastener elements; and
solidifying the plastic material after deposit of one of each droplet and each group of droplets by delivery of energy.

38. A method according to claim 37 wherein
the backing element is a sheet.

39. A method according to claim 37 wherein
the backing element is a textile material.

40. A method according to claim 39 wherein
the textile material is knitted or woven.

41. A method according to claim 37 wherein
the backing element is a molded element.

42. A method according to claim 41 wherein
the molded element is a profile element.

43. A method according to claim 37 wherein
the application device has at least one nozzle; and
plastic material is sprayed from the nozzle with each droplet having a volume measured in picoliters.

44. A process according to claim 43 wherein
liquid plastic is sprayed from the nozzle.

45. A process according to claim 43 wherein
the backing element and the nozzle are moved to vary the locations of the droplets in the three dimensions.

46. A process according to claim 37 wherein
the energy is electromagnetic radiation.

47. A process according to claim 46 wherein
the energy is ultraviolet radiation or infrared radiation.

48. A process according to claim 37 wherein
the energy results from a chemical reaction.

49. A process according to claim 37 wherein at least one of the backing element and the application device is moved for solidification to a location different from a position for a preceding droplet deposit.

50. A process according to claim 37 wherein after solidification, the plastic material has flexibility suitable for hooking and releasing of adhesive fastener elements.

51. A process according to claim 37 wherein the droplets are deposited at a frequency greater than 50 hertz.

52. A process according to claim 51 wherein the frequency is in a kilohertz range.

* * * * *